United States Patent [19]

Ring

[11] Patent Number: 4,480,963
[45] Date of Patent: Nov. 6, 1984

[54] PUMP SWASHPLATE CONTROL ASSIST

[75] Inventor: Curtis P. Ring, Calgary, Canada

[73] Assignee: Deere & Company, Moline, Ill.

[21] Appl. No.: 443,416

[22] Filed: Nov. 22, 1982

[51] Int. Cl.³ .............................. F04B 49/00
[52] U.S. Cl. ...................... 417/216; 60/444;
    60/447; 60/452; 417/217; 417/218; 417/222
[58] Field of Search .............. 60/443, 444, 445, 447,
    60/452; 417/216–222

[56] References Cited

U.S. PATENT DOCUMENTS 3,708,978  1/1973  Reiff et al. ............... 60/488
3,935,707  2/1976  Murphy et al. ........... 60/447 X
4,017,218  4/1977  Burk et al. ............... 60/447 X

FOREIGN PATENT DOCUMENTS 2363480  6/1975  Fed. Rep. of Germany ...... 417/221

Primary Examiner—Edward K. Look

[57] ABSTRACT

A hydrostatic drive system includes a hydraulic motor driven by a variable displacement axial piston pump with alternative intake and output ports. A charge pump generates a charge pressure which is communicated only to the pump intake port via a charge valve unit. The pump displacement is controlled by a swashplate which is moved by servo pistons which receive fluid from a displacement control valve. A three check valve unit communicates the higher of pump intake, outlet and charge fluid pressures to an inlet of the displacement control valve.

11 Claims, 2 Drawing Figures

PUMP SWASHPLATE CONTROL ASSIST

BACKGROUND OF THE INVENTION

The present invention relates to hydraulic systems including axial piston pumps and, in particular, relates to closed center hydrostatic drive systems with variable displacement axial piston pumps.

Closed center hydrostatic drives with variable displacement axial piston pumps require a source of pressure to provide a control pressure for the servo pistons which control the pump swashplate angle. In many such systems, the charging pump pressure is utilized in conjunction with large servo pistons for controlling swashplate angle. Other such systems utilize the output or system pressure as this control pressure with reduced size servos. This system pressure is normally adequate, except when the swashplate is in a neutral or low pump output position or when the pump is supplying fluid to an overrunning load. In these latter situations, the system pressure may be less than what is required for adequate control of the servo pistons or, in otherwords, less than what is required to overcome the friction which tends to resist changes in the position of the swashplate and piston inertia which tends to increase the swashplate angle.

SUMMARY OF THE INVENTION

An object of the present invention is to provide an adequate swashplate servo piston control pressure in a hydrostatic drive having a variable displacement axial piston pump when the inlet and outlet ports are at the same pressure.

This and other objects are achieved by the present invention which includes a variable displacement axial piston pump with a servo piston controlled swashplate and intake and output ports. A charge pump provides a pressurized charge fluid to the pump intake port via a shuttle valve which is responsive to fluid pressure in the intake and output ports and which prevents fluid communication between the output port and the charge pump. The shuttle valve provides a flow restriction when the piston pump inlet and outlet ports are at the same pressure. This restriction disappears as the shuttle valve moves to the side in response to pressure from either piston pump port. A displacement control valve controls fluid communication to the servo pistons from a check valve unit. The check valve unit check valve unit includes three check valves, connected to the intake port, the outlet port and the charge pump, respectively, so that the higher of the intake ports, the outlet port and the charge pump pressures is communicated to an inlet of the displacement control valve.

DETAILED DESCRIPTION

Figure 1:
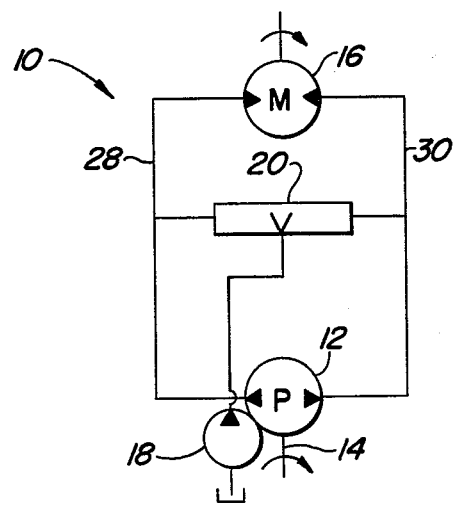
FIG. 1 is a simplified schematic of a hydrostatic drive system which includes the present invention.

Referring to FIG. 1, a conventional hydrostatic drive system 10 includes a variable displacement axial piston pump 12 which rotates in response to a torque applied to an input drive shaft 14 and pumps fluid to and from a hydraulic motor 16. A charge pump 18 supplies pressurized charge fluid to the system 10 via charge valve 20 to make up for fluid losses due to leakage.

Figure 2:
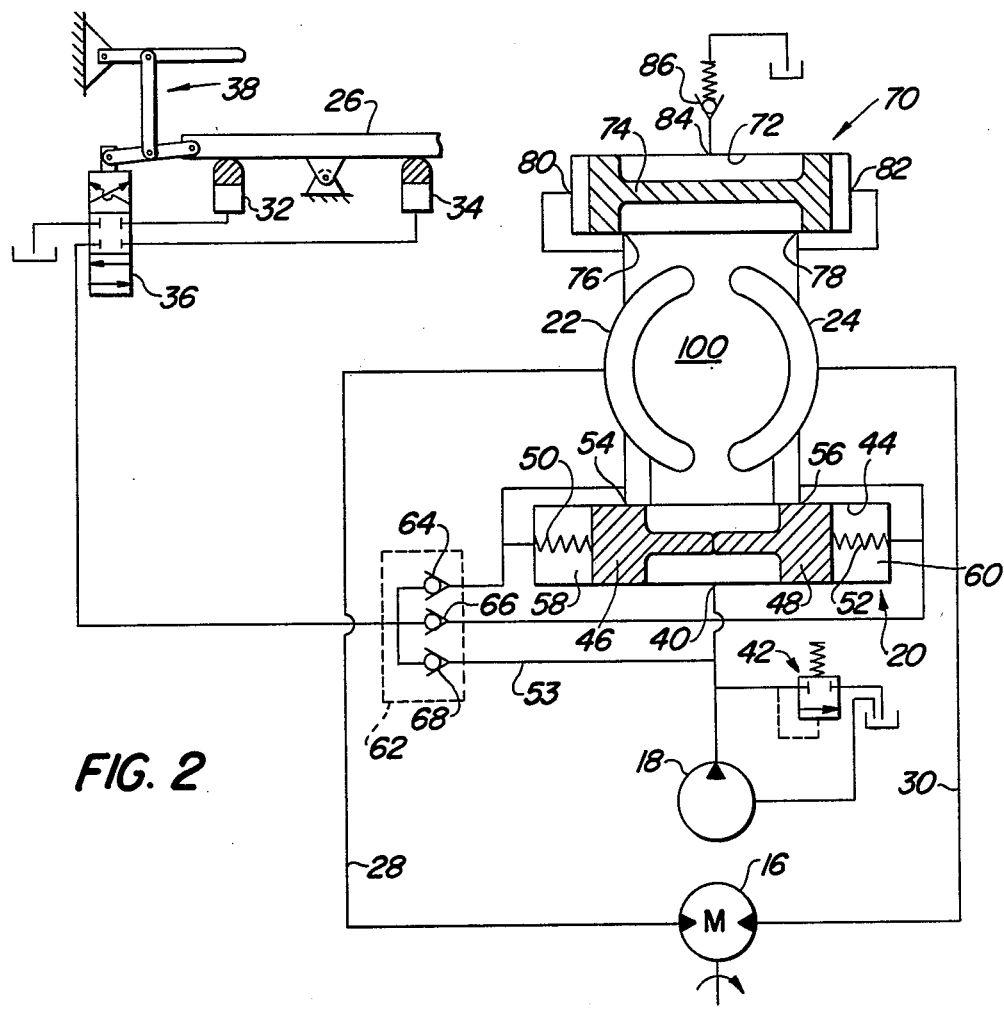
FIG. 2 is a more detailed schematic of a hydrostatic drive system, including the present invention.

Referring now to FIG. 2, the axial piston pump 12 includes first and second ports 22 and 24 which alternately function as an inlet and an outlet, depending upon the direction of rotation and position of swashplate 26. Ports 22 and 24 communicate high pressure and return pressure fluid to and from the motor 16 via lines 28 and 30. The position of swashplate 26 is controlled by servo pistons 32 and 34 which receive fluid from control valve 36 which is connected to a manual input receiving linkage 38.

The charge pump 18 supplies pressurized charge fluid to inlet port 40 of charge valve 20. This charge fluid is limited to a predetermined pressure level, such as 18 bar, by pressure relief valve 42. The charge valve 20 includes a valve bore 44 which slidably receives a pair of valve members 46 and 48. When the swashplate 26 is in a neutral position and the pressure in lines 28 and 30 is equalized, springs 50 and 52 urge valve members 46 and 48 together to the neutral position, shown in FIG. 2. This causes a restriction to charge valve outlets 54 and 56. The result is that pressure in line 53 is higher than the pressure in ports 22 or 24. Valve member 46 is movable in response to fluid pressure in chamber 58 which is communicated with line 28 via pump port 22. Valve member 48 is movable in response to fluid pressure in chamber 60 which is communicated with line 30 via pump port 24.

When valve member 46 is moved in response to pressure in chamber 58, it pushes valve 48 back against its spring 52. This reduces the restriction at outlet 56. When valve 48 is bottomed out in this manner, the restriction at outlet 56 essentially disappears and the pressure at the outlet of charge pump 18 is essentially the same as charge pressure in port 24. Due to symmetry, the same is true when port 24 is at high pressure and port 22 is at charge pressure.

A three check valve unit 62 includes a first check valve 64 which permits one-way fluid flow from line 28 and port 22 to control valve 36, a second check valve 66 which permits one-way fluid flow from line 30 and port 24 to control valve 36 and a third check valve 68 which permits one-way fluid flow from charge pump 18 to control valve 36. Thus, check valve unit 62 will communicate the highest of the fluid pressures in lines 28, 30 or charge pump pressure to the control valve 36 for operation of the servo pistons 32 and 34.

This system may also be provided with a pressure-regulating means 70 for regulating the fluid pressure in whichever of lines 28 and 30 is the return line to a maximum pressure, which is lower than the pressure provided by charge pump 18, for example, 10 bar. The pressure regulating means 70 includes a valve bore 72 which slidably receives a shuttle valve member 74. Inlet ports 76 and 78 communicate the valve bore 72 with pump ports 22 and 24, respectively. Sensing ports 80 and 82 communicate the ends of valve bore 72 with pump ports 22 and 24, respectively. Outlet 84 communicates valve bore 72 with a reservoir via regulating valve 86. When pump 12 is pumping fluid to and from motor 16 via lines 28 and 30, the high system pressure in one of lines 28 and 30 moves shuttle valve member 74 to open to outlet 84 the one of inlets 76 and 78 which is communicated with the return pressure in the other of lines 28 and 30, thereby limiting the return pressure in that other of lines 28 and 30. At the same time, shuttle valve member 74 closes communication between outlet 84 and the other of inlets 76 and 78.

Normally, this system pressure in this one of lines 28 and 30 will be higher than the charge fluid pressure from charge pump 18 and higher than the return pressure in the other of lines 28 and 30. In this case, one of check valves 64 and 66 will communicate this higher system pressure to control valve 36, thus providing a control pressure which is sufficient to operate the servo pistons 32 and 34.

However, if the pump 12 is providing fluid to a motor 16 which is under the influence of an overrunning load, or if the swashplate 26 is in a neutral position so that no or very little fluid is flowing between pump 12 and motor 16, then the pressure in both lines 28 and 30 may be lower than the charge fluid pressure and thereby insufficient for operation of the servo pistons 32 and 34. In this case, check valve 68 will communicate the higher charge pump pressure from charge pump 18 to control valve 36 so that there will be sufficient control pressure available to control the position of swashplate 26 under this neutral or overrunning load condition.

While the invention has been described in conjunction with a specific embodiment, it is to be understood that many alternatives, modifications, and variations will be apparent to those skilled in the art in light of the aforegoing description. Accordingly, this invention is intended to embrace all such alternatives, modifications, and variations which fall within the spirit and scope of the appended claims.

I claim:

1. A hydraulic pressure pump stroking assist for use with a hydraulic pump having intake and output ports, movable means for varying pump displacement, servo means for controlling the position of the movable means, and control valve means for controlling the flow of pressurized fluid to and exhaust of fluid from the servo means, the stroking assist comprising:
   charge means for providing a pressurized charge fluid;
   charge valve means for communicating the charge means with the pump intake port and for preventing communication between the charge means and the pump output port; and
   differentiating means for receiving fluid pressure from the charge means, from the pump intake port and from the pump output port and for communicating the higher of said pressures to the control valve means, the differentiating means including first, second and third check valves, a first passage directly communicating charge fluid from an inlet of the charge valve to the first check valve, a second passage communicating only the pump intake port to the second check valve, a third passage communicating only the pump output port to the third check valve and a fourth passage communicating all of the check valves to the control valve means.

2. The invention, as set forth in claim <, wherein said charge valve means includes a valve bore having an inlet port connected to the charge means for receiving fluid therefrom, and an outlet port connected to the pump intake port, a valving member slidably mounted in the bore for movement between a first position reducing fluid communication between the inlet and outlet ports and a second position providing free flow of fluid between the inlet and outlet port, means normally biasing the valving member to the first position, second servo means associated with the valving member responsive to fluid pressure from the charge means to move the valving member toward the second position against the force of the biasing means and third servo means associated with the valving member responsive to fluid pressure from the pump port to move the valving member to the second position against the force of the biasing means.

3. A hydraulic pump system comprising:
   a main pump having intake and output ports, a displacement control means infinitely movable between positions of maximum and zero displacement, first servo means for controlling the movement and position of the displacement control means, and control valve means for controlling the supply of fluid to and exhaust of fluid from the first servo means;
   fluid pressure regulating means connected to the intake port for regulating fluid pressure in the intake port to a first predetermined pressure;
   a charge pump for providing charge fluid to the main pump intake port at a second predetermined pressure greater than the first predetermined pressure;
   charge valve means interposed between the charge pump and the main pump and including a body forming a valve bore having an inlet port connected to the charge pump and first and second outlet ports connected to the main pump intake and output ports, respectively, a shuttle valve slidably mounted in the bore for movement between a neutral position reducing fluid communication between the inlet and outlet ports and a second position providing free communication between the inlet and the first outlet port and preventing communication between the inlet and the second outlet, means yieldably biasing the shuttle valve to the first position, and servo means associated with the shuttle valve responsive to fluid pressure from the output port to move the shuttle valve to its second position; and
   differentiating means for supplying the higher of the charge pump pressure and the pressure in the output port to the control valve means.

4. The invention, as set forth in claim 3, wherein the differentiating means includes a first and second fluid line means connected to the intake and output ports, respectively, a third fluid line means connected to the inlet port of the charge valve means, a fourth fluid line means connected to the control valve means, and a check valve means interposed in the first, second and third fluid line means preventing flow of fluid from the fourth fluid line into the first, second and third fluid line means.

5. A low pressure pump stroking assist for a reversible hydraulic pump having first and second ports alternatively serving as intake and output ports, movable means for varying volume and direction of displacement, first servo means responsive to fluid pressure for controlling movement and position of the movable means, and control valve means for controlling the supply of pressurized fluid to and exhaust of fluid from the first servo means, the stroking assist comprising:
   charge means for providing a pressurized charge fluid;
   charge valve means for communicating the charge fluid to only one of the first and second ports in response to a differential pressure between the first and second ports and for communicating charge fluid to both the first and second ports when the fluid pressure in the first and second ports is equal; and differentiating means responsive to the pressure of the charge fluid and to the pressure of fluid in the first and second ports to provide the higher of the pressures to the control valve means, the differentiating means including first fluid transfer means receiving charge fluid from the charge means, second fluid transfer means receiving fluid from the first port, third fluid transfer means receiving fluid from the second port, fourth fluid transfer means connecting the first, second and third fluid transfer means to the control valve means, and a check valve interposed in each of the first, second and third fluid transfer means preventing fluid flow from the fourth fluid transfer means through the first, second and third fluid transfer means.

6. The invention, as set forth in claim 5, wherein said charge valve means includes a valve bore having an inlet port connected to the charge means for receiving fluid therefrom and first and second outlet ports connected to the first and second pump ports, respectively, first and second valving members slidably mounted in the valve bore for movement between first positions in which they reduce fluid communication between the inlet port and the first and second outlet ports and a second position in which they permit flow of fluid from the inlet port to one of the outlet ports and prevent fluid flow from the inlet port to the other of the outlet ports, means normally biasing each of the first and second valving members to their first position, and a second servo means associated with each of the valving members responsive to fluid pressure from the first and second pump ports to move the respective valving member toward the second position against the force of the biasing means.

7. A hydraulic pump system comprising:
a main pump having first and second ports alternatively serving as intake and output ports, a displacement control means infinitely movable to either side of a zero displacement position to positions of maximum displacement in opposite directions, first servo means responsive to fluid pressure for controlling the movement and position of the displacement control means, and control valve means for controlling the supply of pressurized fluid to and exhaust of fluid from the first servo means;
a charge pump for providing charge fluid;
charge valve means for communicating charge fluid to the one of the first and second pump ports having the lower pressure and to both the first and second pump ports if the pressure of the fluid in the first and second pump ports is equal, the charge valve means including a valve bore having first and second ends, an inlet port intermediate its ends connected to the charge pump, a first outlet port intermediate the first end and the inlet port connected to the first pump port and a second outlet port intermediate the second end and the inlet port connected to the second pump port, a first shuttle valve member slidably mounted in the valve bore for movement between a neutral position reducing fluid communicating between the inlet port and the first outlet port and a second position providing fluid communication between the inlet port and the first outlet port, a second shuttle valve member slidably mounted in the valve bore for movement between a neutral position reducing communication between the inlet port and the second outlet port and a second position providing communication between the inlet port and second outlet port, means yieldably biasing each of the first and second shuttle valve members toward its neutral position, and each of the first and second shuttle valve members, including an inner servo area responsive to fluid pressure from the charge pump, to urge the respective shuttle valve member toward its second position against the yieldable biasing means.

8. The invention, as set forth in claim 7, wherein the first and second shuttle valve members are in engagement with each other when they are in their neutral positions, the first and second shuttle valves are each movable to a third position in which it blocks communication between the inlet port and its respective outlet port, and each of the first and second shuttle valve members includes an outer servo area responsive to fluid pressure in the first and second pump ports, respectively, to urge the respective shuttle valve toward the third position and the other shuttle valve toward its second position.

9. The invention, as set forth in claim 8, wherein the differentiating means includes a first fluid line connected to the charge pump for receiving charge fluid therefrom, a second fluid line connected to the first pump port for receiving fluid therefrom, a third fluid line connected to the second pump port for receiving fluid therefrom, a fourth fluid line connected to each of the first, second and third fluid lines and the control valve means for transferring fluid from the first, second and third fluid lines to the control valve means, and a check valve interposed in the first, second and third fluid lines preventing flow of fluid from the fourth fluid line through the first, second and third fluid lines.

10. The invention of claim 9, further comprising:
means responsive to fluid pressure in the first and second ports for limiting the fluid pressure in the one of the first and second pump ports having the lower pressure to a first predetermined pressure and for limiting the pressure in both the first and second pump ports to the first predetermined pressure when the pressure in the first and second pump ports is equal.

11. The invention, as set forth in claim 10, wherein the means for limiting fluid pressure includes means providing a valve bore having first and second inlets connected to the first and second pump ports, respectively, and an outlet port connected to a fluid reservoir through a pressure limiting valve, a shuttle valve movable from a centered position in which it permits communication between the inlet ports and the outlet port to a first side position to block communication between the first inlet port and the outlet port while permitting communication between the second inlet port and the outlet port and to a second side position to block communication between the second inlet port and the outlet port while permitting communication between the first inlet port and the outlet port, said shuttle valve having first and second servo areas responsive to fluid pressure from the first and second pump ports, respectively, to urge the shuttle valve to the first and second side positions, respectively.

* * * * *

UNITED STATES PATENT AND TRADEMARK OFFICE
CERTIFICATE OF CORRECTION

PATENT NO. : 4,480,963

DATED : 6 November 1984

INVENTOR(S) : Curtis Phillip Ring

It is certified that error appears in the above-identified patent and that said Letters Patent is hereby corrected as shown below:

Column 3, line 60, delete "<" and insert -- 1 --.
Column 3, line 68, delete "port" and insert -- ports --.
Column 4, line 7, after "pump", insert -- output --.
Column 4, line 64, delete "a".
Column 4, line 66, delete "the".

Signed and Sealed this

Second Day of July 1985

[SEAL]

Attest:

DONALD J. QUIGG

Attesting Officer     Acting Commissioner of Patents and Trademarks